United States Patent [19]

Brooks

[11] 3,905,454

[45] Sept. 16, 1975

[54] IMPACT ABSORBING SYSTEM

[75] Inventor: Ralph J. Brooks, Langhorne, Pa.

[73] Assignee: Andrew R. Klein, trustee, Philadelphia, Pa.

[22] Filed: Aug. 24, 1973

[21] Appl. No.: 391,370

Related U.S. Application Data

[62] Division of Ser. No. 175,668, Aug. 27, 1971, Pat. No. 3,851,911.

[52] U.S. Cl.................. 188/1 C; 267/154; 267/182; 293/1; 293/60
[51] Int. Cl.[2]................... B60R 19/06; B61F 19/04; F16D 63/00; F16F 13/00
[58] Field of Search............ 188/1 C; 267/151, 154, 267/182; 293/1, 60, 84, 85, 86, 89

[56] References Cited
UNITED STATES PATENTS

| | | |
|---|---|---|
| 1,633,901 | 6/1927 | Ohlendorf............................ 293/86 |
| 1,638,501 | 8/1927 | Mische et al. ........................ 293/85 |
| 3,068,039 | 12/1962 | Barenyi............................. 293/86 X |
| 3,210,110 | 10/1965 | Chieger................................. 293/84 |
| 3,759,351 | 9/1973 | Purple................................. 188/1 C |
| 3,851,911 | 12/1974 | Brooks............................. 293/86 X |

Primary Examiner—M. Henson Wood, Jr.
Assistant Examiner—Howard Beltran
Attorney, Agent, or Firm—Synnestvedt & Lechner

[57] ABSTRACT

A bumper mounting assembly particularly for automobiles in which mild shocks are transmitted to and are primarily absorbed by a pair of transverse torsion bars carried on the front end of the vehicle frame. Shocks which pass beyond the resistance zone of the torsion bars are absorbed by a pair of rolls of corrugated sheet material carried in cylinders mounted on the frame.

1 Claim, 13 Drawing Figures

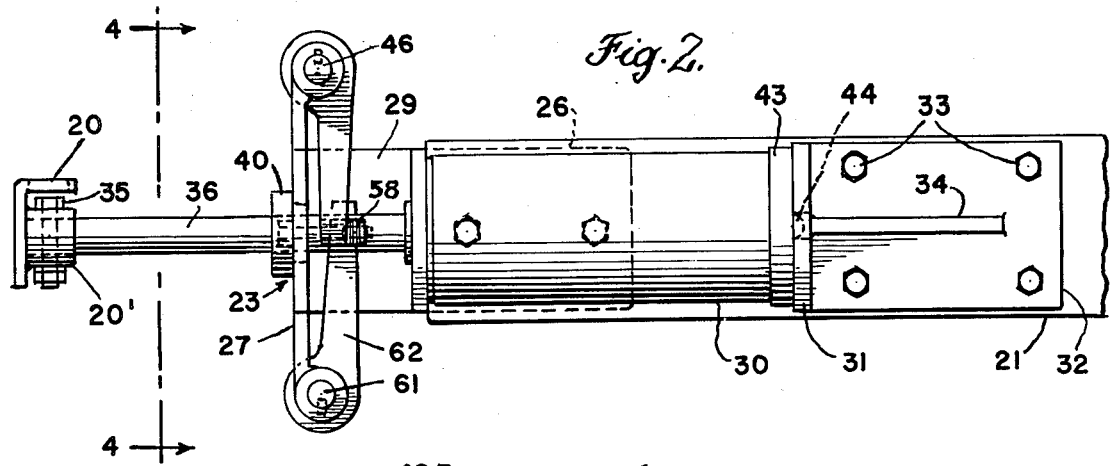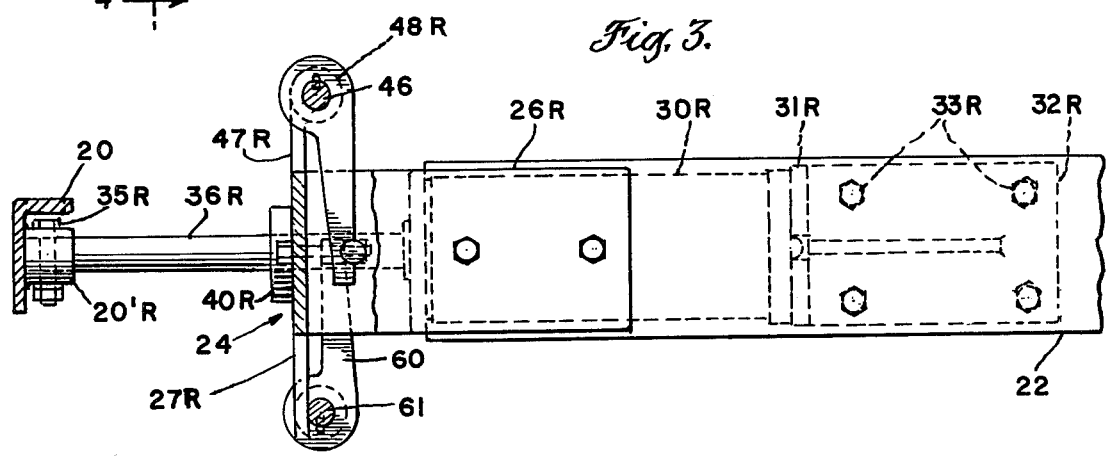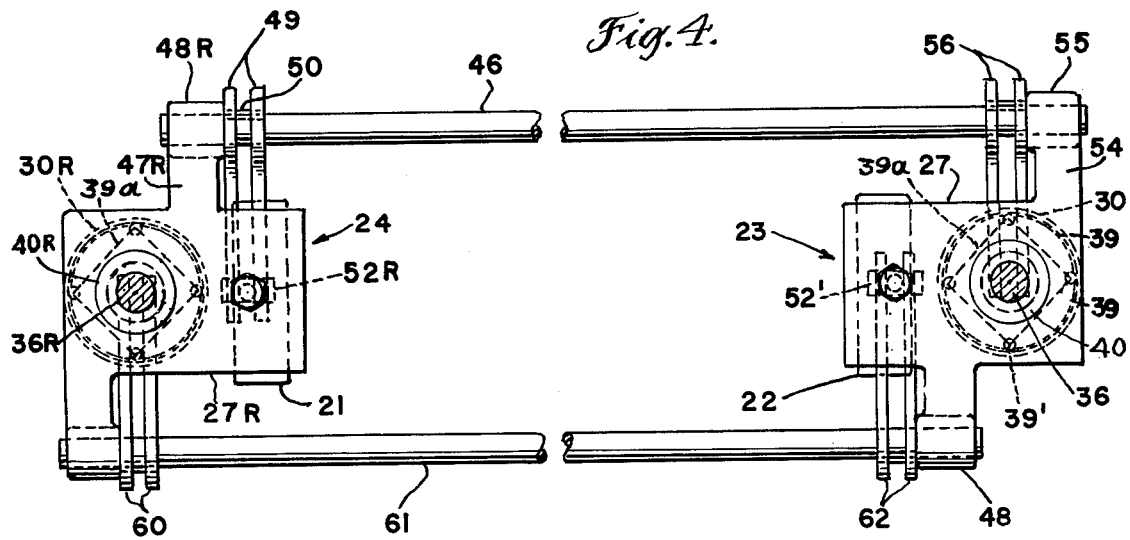

PATENTED SEP 16 1975 3,905,454
SHEET 3 OF 3
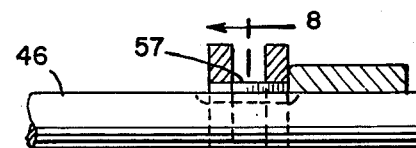
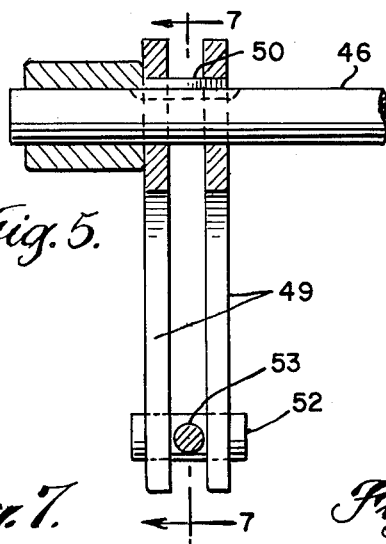
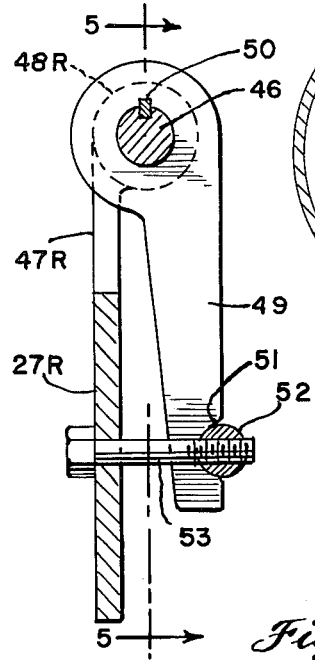
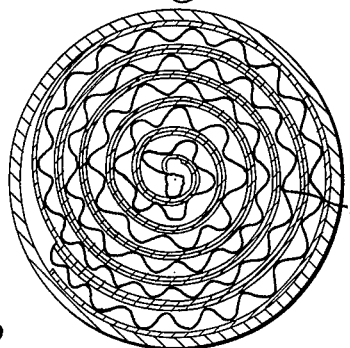
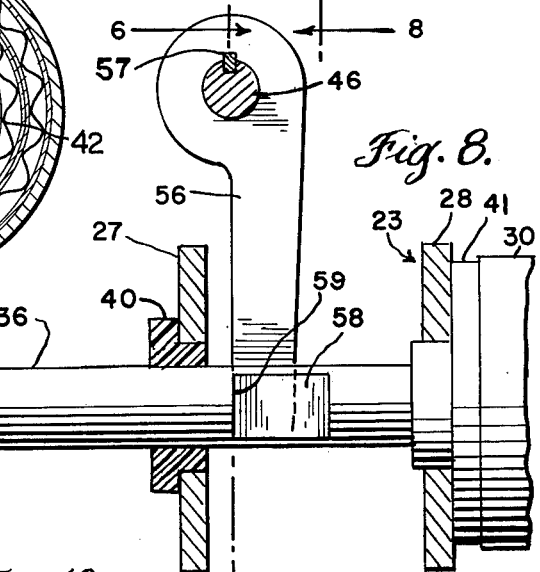
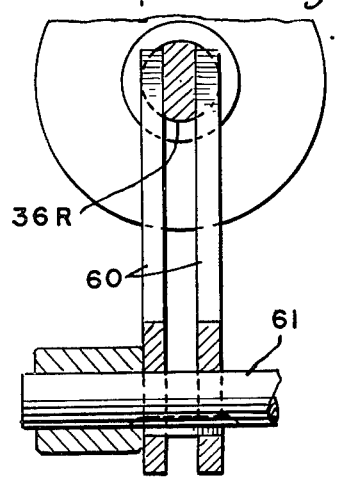
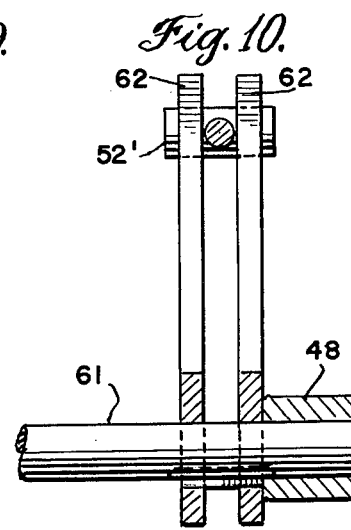
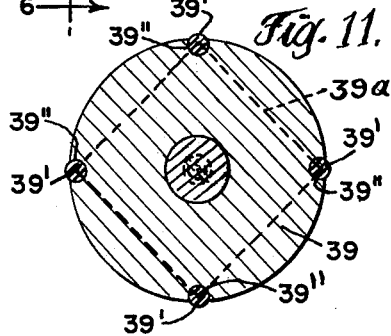

IMPACT ABSORBING SYSTEM

This application is a division of copending application Ser. No. 175,668, filed Aug. 27, 1971, now U.S. Pat. No. 3,851,911, issued Dec. 3, 1974.

This invention relates to impact absorbing bumpers for vehicles. Its primary purpose is to dissipate the shock of a collision by distributing the energy released by such a shock in ways which will reduce the effect of the impact on the vehicle and on persons riding in the vehicle.

The shock-dissipating apparatus comprises two impact absorbing systems. The first of these interposes high resistance immediately after impact. The other system exhibits little, if any, resistance immediately after impact, but its resistance increases rapidly, in proportion to increasing severity of shock, as and after the limits of the first system are reached.

Other objectives of the invention include the provision of a mechanism which it is relatively inexpensive to manufacture, which is rugged and dependable in its operation, which will absorb repeated shocks of the type produced by collision with a fixed object at speeds in the neighborhood of 5 to 10 miles per hour, and which will absorb a single impact at speeds up to about 20 miles or possibly 25 miles per hour at the expense of crushing expendable material used to cushion such heavy impacts, which material will thereafter have to be replaced. Making the crushable material available in a readily usable and marketable form is an incidental objective.

How these and other objectives which are incident to the invention are attained will become apparent from inspection of the accompanying drawings, and consideration of the description which follows, in which there is disclosed what is at present the preferred embodiment of the invention.

In the description which follows it is assumed that the reader is seated in the driver's seat, so that "left" refers to the driver's side of the vehicle and "right" refers to the opposite side.

In the drawings:

FIG. 2 is a side elevational view taken as indicated by the arrows 2—2 in FIG. 1;

FIG. 3 is a sectional view taken as indicated by the arrows 3—3 in FIG. 1;

FIG. 4 is a broken out front view taken as indicated by the arrows 4—4 in FIG. 2;

FIG. 5 is an enlarged fragmentary sectional view of the lever device located at the right hand end of the upper torsion bar, the section being taken on the line 5—5 of FIG. 7;

FIG. 6 is an enlarged fragmentary sectional view of the lever device located at the opposite or left hand end of the upper torsion bar, the section being taken on the line 6—6 of FIG. 8;

FIG. 7 is a cross section taken on the line 7—7 of FIG. 5;

FIG. 8 is a cross section taken on the line 8—8 of FIG. 6;

FIG. 9 is a fragmentary view of the lever device located at the right hand end of the lower torsion bar;

FIG. 10 is a fragmentary view of the lever device located at the left hand end of the lower torsion bar;

FIG. 11 is a cross-section of a guided piston head; and

FIG. 13 is a cross section, on an enlarged scale, taken along the line 13—13 of FIG. 1.

A reference number followed by the letter "R" indicates that the part so designated is a counterpart of one bearing the same number but on the left side of the vehicle, the letter "R," of course, signifying "right."

Figure 1:
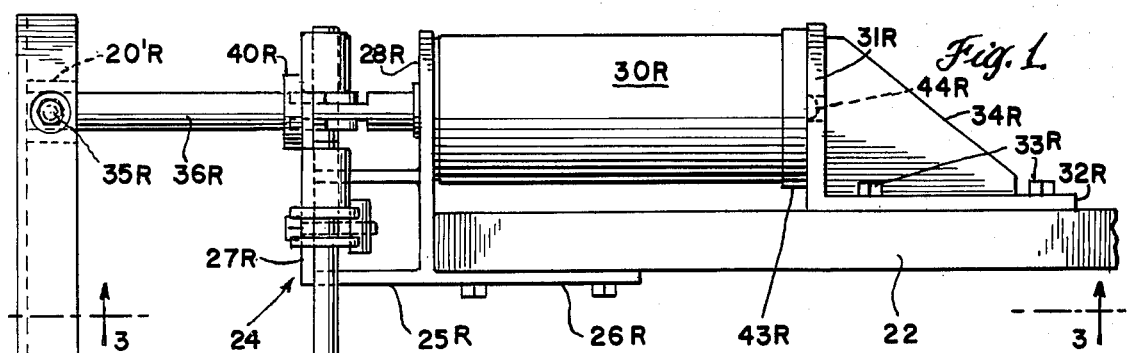
FIG. 1 is a plan view illustrating an impact absorbing bumper constructed in accordance with the invention, applied to a vehicle chassis.

Turning now to FIG. 1: The angle iron 20 constitutes a support for a conventional bumper for the front end of a vehicle. Means for mounting two ends of this bumper on the side members 21 and 22 which form a part of the main frame of the vehicle will now be described.

The mounting structure on the left side comprises a sub-frame 23 and that on the right side is a sub-frame 24. These sub-frames are similar to box girders. They are identical in form, but, as will be seen in FIG. 4, sub-frame 24 is inverted, as compared to sub-frame 23. Unless a significant difference in structure is involved, therefore, the discussion which follows will relate to the mechanism carried on the left frame member 21, it being understood that the right structure is its counterpart.

In frame 23 the inner wall 25 has a tongue 26 which extends rearwardly beyond the front end of the frame member 21 and is firmly mounted on that member, as by bolts, rivets, or welding. The front wall 27 of the box girder 23 extends several inches outwardly from the frame member 21. There is an intermediate lateral flange 28 which extends outwardly from the inner wall 25 at a point approximately at the forward end of the frame element 21. This extends outwardly for about the same distance as the front wall 27. Between the front wall 27 and the flange 28 there is a vertical web 29 which is parallel to the inner wall 25 and which serves to stiffen and support the entire sub-frame 23. The lateral flange 28 is so configured as to support a cylindrical member 30 which extends longitudinally of the vehicle, parallel to the frame member 21. This cylindrical member is supported at its rear end by a horizontal buttress comprising the lateral wall 31 extending outwardly from the frame to which it is adjacent, and a longitudinal wall or flange 32 which secures the angle member to the frame by means of bolts 33,33. The buttress, furthermore, is stiffened by a gusset plate 34 since the major shock of heavy impact will be transmitted to the frame through this buttress, either alone or in conjunction with the corresponding buttress on the right frame member 22.

The bumper support 20 has sockets 20',20' R welded thereto. These receive the forward ends of heavy supporting rods 36,36R, which are secured therein by bolts 35,35R. The rod 36 passes through aligned apertures 37 and 38 in the front wall 27 and the lateral flange 28, respectively. It terminates in the piston head 39 which lies within the cylinder 30. The apertures 37 and 38 in wall 27 and flange 28 are substantially larger than the outer diameter of the rod 36. The former accomodates a nylon bushing 40, which reduces friction and also avoids scraping of the rod 36 against the edge of the metal aperture, as might occur if the shock of a collision were to impose thrust at a lateral angle on the rod 36. The latter (aperture 38) receives the neck of a cap piece 41 which covers the forward end of the cylinder 30.

Behind the rear face of the piston 39, the cylinder 30 is filled by a helix 42 of corrugated sheet material, preferably cardboard (see FIG. 13). The ridges and valleys of this corrugated material extend in an axial direction, so as to take full advantage of the very great columnar strength of the corrugated cardboard. The helix is, of course, confined, radially, by the cylinder 30. The rear end of the cylinder 30 may have a cup-like reinforcement 43 which preferably carries an outwardly projecting dimple 44. The dimple nests in a socket 45 which is formed in the front wall 31 of the buttress, to center and support the cup 43.

The piston 39 is guided and supported within the cylinder by means of a plurality of spacer rods 39', preferably of Teflon (tetrafluoroethylene) or other low friction plastic. These spacer rods are illustrated in more detail in FIG. 11, in which four of them are shown, 90° apart. They are of much smaller diameter than the piston head.

To mount and hold the spacer rods firmly in place, longitudinal peripheral sockets 39'' are drilled blind into the piston head. That is to say, these grooves or sockets are not as long as the piston head, and their open ends are closed by a cover plate 39a so as to ensure that the spacer rods 39' do not work out of their sockets as the piston is moved from time to time under relatively small impacts.

The sockets are mainly circular in cross section, but each interrupts the cylindrical surface to form a slot which is considerably narrower than the diameter of the socket. Thus the spacer rods 39', being fully circular in cross section, present an arcuate surface which rises above the cylindrical surface of the piston head. For instance, if the sockets shown are three-eighths inch in diameter, the rods will project about one-eighth inch above the surface of the head.

Presently, the method for forming the sockets 39'' is to make the piston head substantially larger than its final size, and drill out the sockets, just inside the outer surface of the piston head. Thus the drills will work entirely in solid metal, within the circumference of an oversize piston head. When the holes have been drilled to the prescribed depth, the present technique is to machine away some of the peripheral metal of the piston head, so that when the spacer rods are inserted into the holes which have been drilled to receive them, the circumferential arc of each rod will project above the outer surface of the piston head about one-eighth inch.

Although the Teflon rods project only about one-eighth inch above the finished surface of the piston head, they guide and support the piston rod quite accurately, so that the arbor in bushing 40 may be made larger than the outer diameter of the rod 36. This ensures that repeated movements of the piston 36 will not cause the bushing 40 to work out of the hole 37 in which it is mounted.

The spacer rods 39' ensure that impact received by the bumper supporting rod 36 and transmitted through the torsion bar system (to be described hereafter) will reach the face of the helix of corrugated material with little or no frictional or pneumatic restraints, such as might arise if the piston head accurately fitted the inner diameter of the cylinder.

On the contrary, one of the important advantages of the present invention is that the mechanism just described for dissipating severe shock involves no parts which have to be machined to close tolerances. The spacer rods will serve to guide the piston head into crushing engagement with the helix of corrugated sheet material behind it whether or not the interior surface of the cylinder has been accurately machined, and whether or not the exterior surface of the piston head has been accurately machined. Clearance is deliberately provided at the head of the cylinder, by forming the neck of the cap 41 with a larger inside diameter than the outside diameter of the rod 36 (FIG. 1). Indeed, it is believed that the problem of drilling sockets for the spacer rods can be entirely eliminated when this device is in full production, by substituting cast piston heads, possibly aluminum. Since they do not touch the inside of the cylinder it makes no difference whether they precisely fit. A great saving in time and expense can be expected from this one feature alone.

The mass of corrugated cardboard or other corrugated sheet material confined within the cylinder 30 is capable of withstanding almost unbelievable loads. It will, nevertheless, crumble under impact, and in so doing will dissipate a surprisingly large proportion of the shock initiated by the impact.

After a severe collision, the buttress element is removed from the frame by unscrewing the bolts 33. These bolts are preferably deliberately undersized, so that they will shear under severe shock before sufficient stress has been transmitted to the longitudinal wall 32 to result in denting or deforming of the chassis itself.

The torsion bars which have been previously mentioned are intended to absorb lesser shocks. They extend transversely of the vehicle, the upper one 46 being shown in FIG. 1, and the system as a whole in FIG. 4.

The front wall 27R of the box girder 24 carries a riser 47R which supports a journal 48R surrounding one end of the torsion bar 46. Mounted on the torsion bar 46 closely adjacent to the journal 48R are a pair of tongues 49,49. These tongues lie in parallel but spaced planes. Their upper ends are widened and the torsion bar passes through arbors in these widened portions, but is keyed to the body of each tongue by means of the key 50. The lower ends of the tongues 49,49 lie within the box girder 24. Each of the tongues is provided with a notch 51 (see FIG. 7) in which an anchor pin 52 is mounted. This anchor pin 52, best seen in FIGS. 5 and 7, is transversely threaded at a mid point, to receive a tension bolt 53 which extends from the anchor pin 52 to and through the front wall member 27R of the box 24. The anchor pin 52, as clearly seen in FIG. 5, is of sufficient length to span the distance between the tongues 49,49 and the bolt 53 passes between these tongues. When it is tightened, it very firmly immobilizes the fixed end of the torsion bar 46.

At the opposite end of the torsion bar 46, the box girder 23 on the driver's side affords a riser 54 which supports a journal 55 of the same general nature as the journal 48R. Two tongues 56,56 are supported at the end of the torsion bar 46 closely adjacent to the journal 55. Like the tongues 49,49, the tongues 56,56 are parallel, are spaced apart, and are secured to the torsion bar 46 by a key 57. The depending tongues engage the rod 36, which carries one end of the bumper at its forward end and the piston head 39 at its rear end.

Engagement of the rod 36 by the fingers 56,56 is effected by machining away a parti-cylindrical portion of the peripheral surface of the rod 36, on opposite sides of that rod, so as to produce a pair of parallel vertical flat lands 58,58. (See FIG. 8.) It will be seen that movement of the rod 36 towards the rear will move the tongues 56,56 towards the rear, because of contact with the vertical segment 59 which remains between the land 58 and the outer circumference of the rod 36. Movement of the tip of the tongues 56,56 will impart rotational movement to the rod 46 because the tongues are keyed to the rod 46 by key 57. Since the opposite end of the torsion bar 46 is firmly anchored, as is illustrated in FIG. 7, any impact which initiates movement of the rod 36 is met by an increasing torsional resistance. As the rod 36 continues its movement towards the rear, the tip ends of the tongues 56,56 will ride up against the segmental surface 59 until eventually they have moved entirely out of contact with the lands 58,58 and are resting upon the upper surface of the rod 36. This position is reached only under quite severe shock. So long as the tongues 56,56 continue to be in contact with the segmental areas 59 they will exert a restoring moment, tending to move the rod 36 back to its natural position and thus restore the bumper to its usual place.

Although the torsion bars will be unable to exert any restoring moment after the tongues 56,56 have ridden up and above the top of the lands 58, there will still be some resilience in the corrugated material tending to restore the piston to its proper place. However, any shock sufficiently severe to result in extensive crushing of the corrugated sheet material will require removal and replacement of it. This is easily accomplished by unbolting and removing the buttress. It is then a simple matter to remove the cap 43 and the crushed material 44 from the rear end of the cylinder 30. Then the piston head can be driven back to its normal position, as by tapping it with the handle of a sledge, and a new cartridge, comprising a helix of fresh corrugated sheet material is slipped into the cylinder 30. Next the buttress is reinstalled, so that the dimple 44 snugs into the dent 45 in the lateral wall 31 which marks the forward end of the gusset plate 34. If the shock has been so severe as to shear the bolts 33, it will, of course, be necessary to replace them. A shock of that magnitude probably will not befall most automobiles more than once or twice in a lifetime of normal use.

As to the lower member of the torsion bar system, little more need be said than to mention the fact that the box girder 23 is of the same configuration as the box girder 24. In FIG. 4, it will be seen that the one is simply an inversion of the other. The fingers 60,60 which are carried by the lower torsion bar 61 are mirror images of the fingers 56,56 which depend from the opposite end of the upper bar 46. They do not depend from the lower bar, but rise vertically above it. They engage the rod 36R and straddle parallel vertical flat lands provided in that rod, in precisely the same manner that the depending tongues 56,56 straddle the flatted surfaces 58,58 in the rod 36 previously mentioned.

Within the box girder 23 there is an anchoring arrangement for the fixed end of the lower torsion bar 61. This is formed by providing notches in the upper ends of the tongues 62,62 which are mounted on the lower torsion bar 61 adjacent the journal 48. These notches are of precisely the same nature as the notches 51,51 shown in FIG. 7, and receive a hold down anchor 52' which is precisely the same in nature and operation as the hold down 52, shown in FIG. 7. Accordingly, motion of the rod 36R on the right side of the car will impart torsional movement to the lower torsion bar 61 in precisely the same way that movement of the rod 36 imparted torsional movement to the upper rod 46, on the left side of the car.

Although I have described the crushable material as being corrugated cardboard, in my preferred embodiment, it is of course apparent that other sheet material can be used instead. Aluminum sheet of an appropriate gauge can be corrugated and wound into a helix, with a ribbon of flat sheet between convolutions, just as easily as cardboard. A technique similar to that employed in making "honeycomb" cells may possibly be available. Even though the adhesives presently used in forming corrugated board may not be useful in making corrugated metal foil objects, it is believed that a helix of corrugated metal foil should display comparable strength.

Since the cylinder in which the corrugated board is placed will normally be so close to the wheels as to involve very considerable exposure to water, it is important to employ a water-resistant coating for the helix, in order to prevent rain damage and the like. I have used ordinary spar varnish for this purpose, although many other materials come to mind which should be equally effective. Because of its flexibility, latex commends itself for such a use as this. Another convenient way to protect the coil of corrugated cardboard against moisture is to enclose it and seal it in a sheath of waterproof plastic sheet material.

Although it is supposed that only a small porportion of the automobiles in use will be involved in front end collisions of sufficient severity to crush the corrugated sheet material in the cylinder 30, it is unfortunately likely that the total number of such collisions will be quite substantial. It is therefore proposed to provide a very inexpensive replacement cylinder, with a roll of corrugated board packed inside it, which would be light in weight and sufficiently strong to withstand the stress. It could be carried in stock and installed conveniently by any service station or garage.

Figure 12:
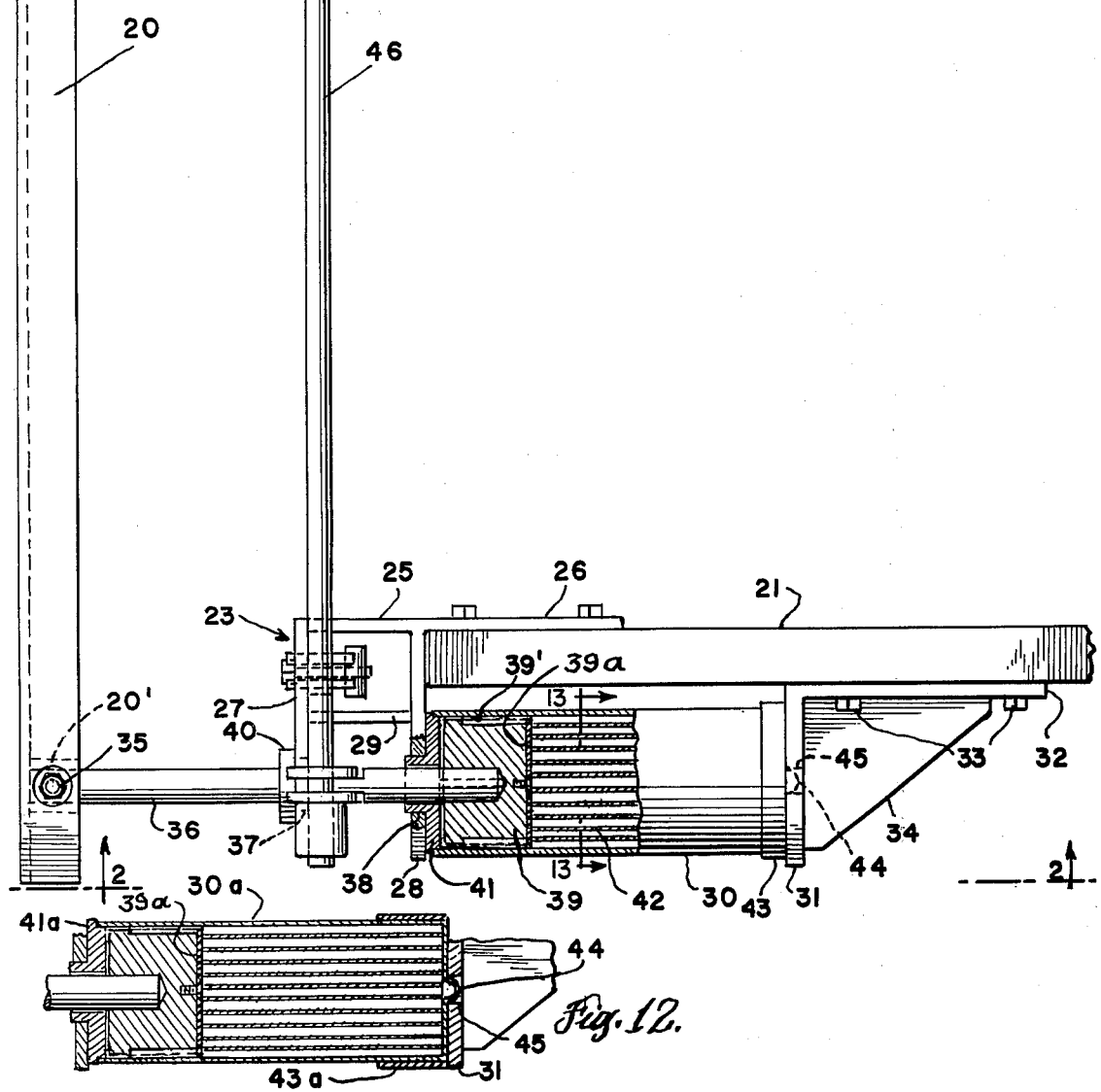
FIG. 12 is a vertical longitudinal section of an alternative embodiment.

This modification of the structure disclosed is effected, as illustrated in FIG. 12, by replacing the cast iron cylinder 30, illustrated in FIGS. 1, 2 and 3, with a "tin" can 30a of comparable size. The 46-ounce can (4¼ inches in diameter) which is presently standard would be approximately right, if elongated somewhat. The top of the can is removed, and the can is then provided with a dimple 44 in the center of the bottom, as by using a spider template and a long punch with a hemispherical end against a die plate with a central dent or arbor.

The helix of corrugated cardboard, impregnated with varnish, is then inserted in the can, and the can is mounted with its front end in registry with a cap member 41a similar to the cylinder cap 41. However, the metal of the cap is lightly rabbeted circumferentially so as to provide a shoulder which neatly fits the inside diameter of the can. The buttress member at the rear is then bolted in position, with the dimple 44 snugged into the dent 45 or arbor 45 in the wall 31 of the buttress member.

In order to afford additional protection against a shock which might be of sufficient magnitude to burst the can prematurely, it is proposed to provide an encircling band 43a of metal at the bottom of the can. This band should be perhaps an inch and a half or 2 inches wide. Its purpose is not to prevent rupture of the can, for the can itself is wholly expendable. Its purpose is to make certain that the can does not burst before the force of the shock has almost completely crushed the corrugated sheet material.

It will be observed that the mechanism herein disclosed makes use of only eight parts. These are: (1) the bumper support, (2) the piston rod, (3) the box girder, (4) the piston head, (5) the cylinder, (6) the buttress, (7) the torsion bar, (8) the fingers. All of the fingers used to lock the torsion bars or to operate the piston rods are of identical construction. Every unit on the driver's side is an exact counterpart of a corresponding unit on the opposite side.

This elimination of the need to use differently shaped parts to fit opposite sides of the vehicle is another significant advantage of the present invention. The reduction in weight which can be secured by substituting a 46 oz. can for the heavier tubing element illustrated in FIG. 1 should be highly advantageous. It is perfectly feasible to do this, because the piston head does not have to establish sliding contact with the inner surface of the cylinder, and in fact should not do so. Therefore, irregularities in shape and rigidity of wall are of no consequence.

In short, it is believed that the present invention establishes a new functional relationship between two wholly different energy-dissipating systems, and that the agencies devised to accomplish this are unusually simple, rugged and inexpensive, both to build and to install. Furthermore, the degree of protection afforded by the invention is notable. It has been suggested in terms of collision with a fixed object, such as a bridge abutment. Had the collision been with a movable object, it is probable that it could have safely taken place at considerably greater speeds.

I claim:

1. Method for dissipating the energy incident to a vehicular collision which comprises the steps of absorbing a major portion of the energy initially generated at the vehicle bumper by applying it radially to the movable end of a torsion bar; and absorbing energy in excess of that absorbed by said torsion bar by expending it to crush a mass of crushable material confined in housing means rigidly positioned on the vehicle.

* * * * *